(12) United States Patent
Bartell

(10) Patent No.: US 8,707,613 B2
(45) Date of Patent: Apr. 29, 2014

(54) FISH HOOK WITH MULTIPLE CONVEX FACETS

(75) Inventor: Joseph E. Bartell, Littleton, CO (US)

(73) Assignee: Wright & McGill Co., Denver, CO (US)

( * ) Notice: Subject to any disclaimer, the term of this patent is extended or adjusted under 35 U.S.C. 154(b) by 212 days.

(21) Appl. No.: 13/109,717

(22) Filed: May 17, 2011

(65) Prior Publication Data

US 2012/0291333 A1    Nov. 22, 2012

(51) Int. Cl.
*A01K 83/00* (2006.01)

(52) U.S. Cl.
USPC ............................. 43/43.16; 43/6; 452/128

(58) Field of Classification Search
USPC ............... 43/43.16, 44.83, 44.82, 6; 452/187, 452/189; 606/184
See application file for complete search history.

(56) References Cited

U.S. PATENT DOCUMENTS

| | | | |
|---|---|---|---|
| 627,179 A | 6/1899 | Dreese | |
| 842,594 A | 1/1907 | Vleck | |
| 1,072,172 A * | 9/1913 | Schell | ............... 43/6 |
| 1,430,626 A | 10/1922 | Christensen | |
| 1,513,400 A | 10/1924 | Koski | |
| 1,604,031 A | 10/1926 | Ferguson | |
| 2,164,807 A | 7/1939 | Evans | |
| 2,514,527 A | 7/1950 | Verhota | |
| 2,539,735 A | 1/1951 | Forsyth | |
| 2,823,485 A | 3/1956 | Traumüller | |
| 3,604,143 A | 9/1971 | Sauers | |
| 4,126,957 A | 11/1978 | Randall | |
| D276,360 S | 11/1984 | Sitton | |
| D288,467 S | 2/1987 | Sitton | |
| 4,723,372 A | 2/1988 | Moser | |
| 4,802,300 A | 2/1989 | Fujii et al. | |
| 4,819,366 A | 4/1989 | Manno | |
| 4,901,467 A * | 2/1990 | Stolpe | ............................. 43/6 |
| 4,905,402 A | 3/1990 | Clark | |
| 4,905,403 A | 3/1990 | Manno | |
| 5,165,197 A | 11/1992 | Sitton | |
| 5,179,809 A | 1/1993 | Schroeder | |
| 5,214,875 A | 6/1993 | Hoben et al. | |
| 5,297,356 A | 3/1994 | Wickham | |
| 5,526,603 A | 6/1996 | Fujii et al. | |
| 5,624,459 A | 4/1997 | Kortenbach et al. | |

(Continued)

FOREIGN PATENT DOCUMENTS

GB     1 204 223 A        9/1970
JP     2005224236 A   *   8/2005

(Continued)

OTHER PUBLICATIONS

Official Action for Chinese Patent Application No. 201220215799.2, mailed on Sep. 18, 2012, 3 pages (with partial English translation).

(Continued)

*Primary Examiner* — Rob Swiatek
*Assistant Examiner* — George Andonyan
(74) *Attorney, Agent, or Firm* — Sheridan Ross P.C.

(57) ABSTRACT

A fish hook with multiple convex facets is provided. Each facet may have a length that is some multiple of the diameter of the hook body. In addition, each convex facet has a radius of curvature that is some multiple of the diameter of the wire. Each facet may alternatively be formed from first and second convex surfaces, having first and second curvatures.

11 Claims, 4 Drawing Sheets

(56) References Cited

U.S. PATENT DOCUMENTS

| | | | |
|---|---|---|---|
| 5,685,108 | A | 11/1997 | Lepage et al. |
| 6,053,927 | A * | 4/2000 | Hamas .......................... 606/138 |
| 6,334,273 | B2 | 1/2002 | Turner et al. |
| 6,910,297 | B1 * | 6/2005 | Sitton .......................... 43/43.16 |
| 7,159,357 | B2 | 1/2007 | Sitton |
| D541,900 | S | 5/2007 | Scott |
| D594,526 | S | 6/2009 | Ferguson et al. |
| D594,527 | S | 6/2009 | Ferguson et al. |
| D594,528 | S | 6/2009 | Ferguson et al. |
| 7,571,564 | B2 * | 8/2009 | Sullivan .............................. 43/6 |
| 2004/0195718 | A1 * | 10/2004 | Obrachta et al. .............. 264/156 |
| 2005/0076557 | A1 * | 4/2005 | Fujii .............................. 43/43.16 |
| 2005/0241214 | A1 * | 11/2005 | Ferguson .................... 43/43.16 |
| 2010/0257711 | A1 | 10/2010 | Ferguson et al. |

FOREIGN PATENT DOCUMENTS

| | | | |
|---|---|---|---|
| JP | 2005348668 | A * | 12/2005 |
| NO | 39388 | | 7/1924 |
| WO | WO 9704648 | A1 * | 2/1997 |
| WO | WO 9714302 | A1 * | 4/1997 |

OTHER PUBLICATIONS

International Search Report for International Patent Application No. PCT/US12/37018, mailed Jul. 16, 2012, 3 pages.

Written Opinion for International Patent Application No. PCT/US12/37018, mailed Jul. 16, 2012, 4 pages.

U.S. Appl. No. 13/545,793, filed Jul. 10, 2012, Bartell.

* cited by examiner

FISH HOOK WITH MULTIPLE CONVEX FACETS

FIELD

The present invention is directed to a fish hook with multiple convex facets.

BACKGROUND

Line and hook fishing is a popular and efficient means of catching fish. Typically, a fish hook is formed from round wire that has been bent into a U or hook shape, with a point at a first end, and an eye at a second end. In a typical fish hook, the point is formed into a conical or "needle point" shape. In order for a conical point to penetrate the fish's mouth, the membrane comprising the lining of the mouth must be stretched over the point before the membrane is punctured. Moreover, the point has to continue to expand the membrane to penetrate up to and beyond the barb, which can require a significant amount of energy.

In order to reduce the force required to penetrate the fish's mouth, faceted points have been developed. A faceted point provides cutting edges that allow the point to more efficiently penetrate the fish's mouth. In particular, the amount of energy required for a faceted point to penetrate a membrane can be much less than is required for a conical point of similar size to penetrate that membrane. However, faceted points typically are weak, and therefore prone to bending or breaking. This is because the faceted surfaces typically acquire a concave shape during the grinding process used to form the facets, leaving little material at or towards the apex of the point. Therefore, the strength and durability of the resulting point may be less than desired.

SUMMARY

The present invention is directed to solving these and other problems and disadvantages of the prior art. In accordance with embodiments of the present invention, a fish hook with multiple convex facets is provided. As a result, at a selected distance from the tip of the point, the cross-section of a point as disclosed herein has more material, and therefore is stronger, than an otherwise similar point with a typical concave facet shape. Accordingly, a strong point that provides multiple cutting edges is provided.

A fish hook as disclosed herein includes a point with two or more convex facets. For example, the point of a fish hook in accordance with embodiments of the present invention can include three convex facets. In accordance with further embodiments, the point can include three or more convex facets. The facets can each have the same or different dimensions. In accordance with further embodiments, the facets can include double radius facets, where each facet follows a first radius over a first portion or distance, and a second radius over a second portion or distance.

In accordance with embodiments of the present invention, the facets have a length that is from about 2 times to about 6 times the diameter of the wire on which the multiple convex facet point is formed. In accordance with further embodiments, the curve of the convex facets follows a radius that is from about 15 times to about 60 times the diameter of the wire on which the multiple convex facets of the point are formed. In accordance with other embodiments, the ratio of the facet length to the wire diameter is about 4.5 to 1, and the ratio of the radius of curvature of the convex facets to the wire diameter is about 30 to 1.

Additional features and advantages of embodiments of the present invention will become more readily apparent from the following description, particularly when taken together with the accompanying drawings.

DETAILED DESCRIPTION

Figure 1:
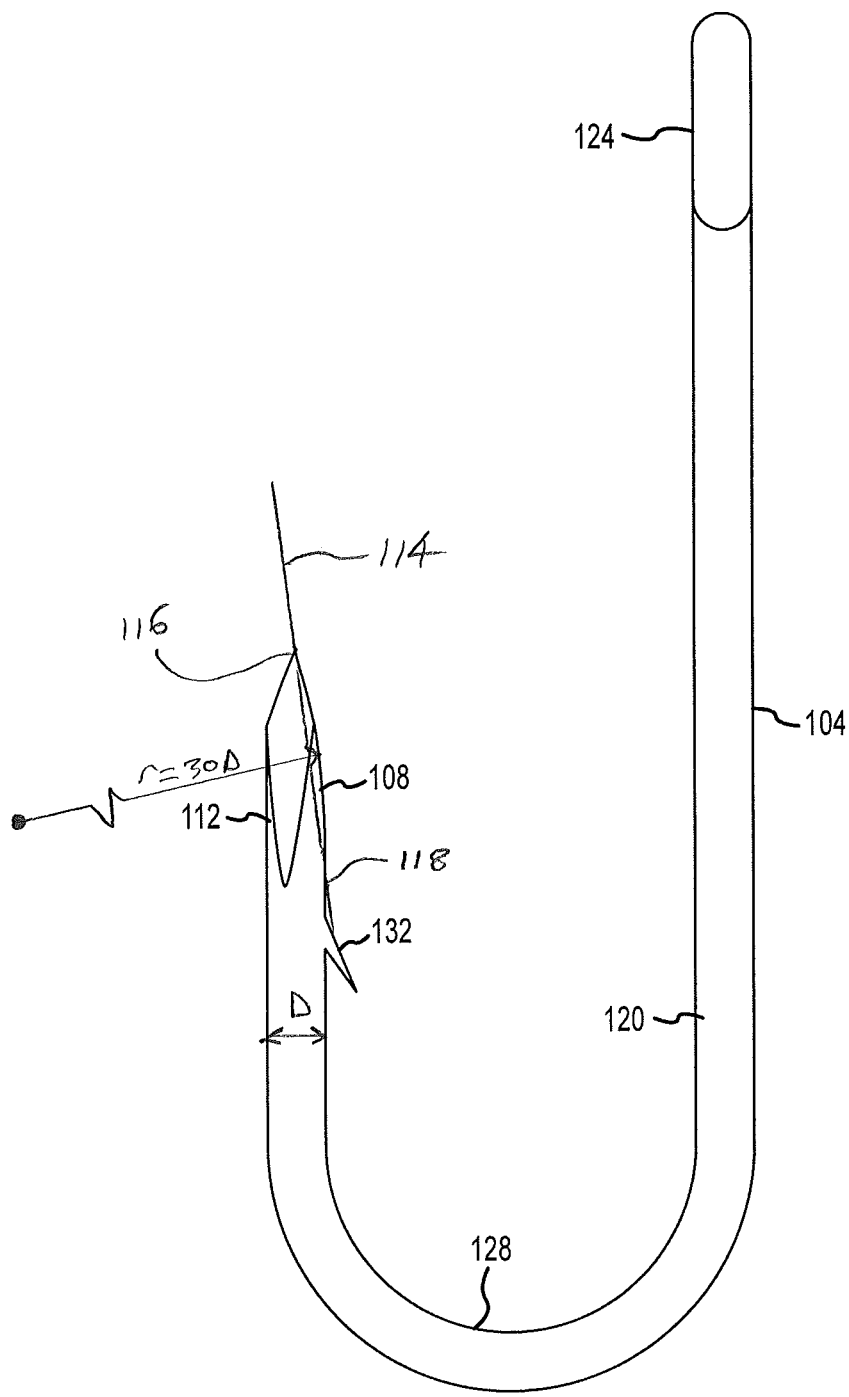
FIG. 1 is a side view of a fish hook with multiple convex facets in accordance with embodiments of the present invention.

FIG. 1 illustrates a fish hook 104 in accordance with embodiments of the present invention. The fish hook 104 includes a point portion 108 formed from multiple facets 112. More particularly, the point portion 108 in accordance with embodiments of the present invention is formed from multiple convex facets 112. The tip 116 of the point portion 108 is located at a first end of a wire blank or body 120 from which the fish hook 104 is formed. In the finished form illustrated in FIG. 1, the fish hook 104 typically includes an eye 124 formed at a second end of the wire body 120 with a bend 128 formed between the first and second ends, creating a hook shape. The fish hook 104 can also include a barb 132 adjacent the point portion 108.

Figure 2:
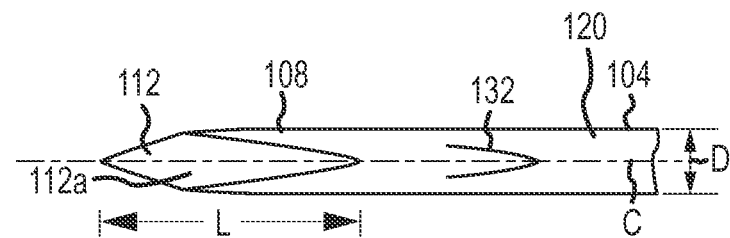
FIG. 2 is a top plan view of a point portion of a fish hook having multiple convex facets in accordance with embodiments of the present invention.

FIG. 2 is a top plan view of the point portion 108 and barb 132 of a fish hook 104 in accordance with embodiments of the present invention. In this embodiment, which features three facets 112, a first facet 112a is shown. In accordance with embodiments of the present invention, the facet 112 has a length L that is from about 2 times to about 6 times the diameter D of the wire body 120. In accordance with still other embodiments, the length L of the facets 112 is about 4.5 times the diameter D of the body 120. As used herein, a dimension or parameter is "about" another dimension or parameter if it is within about 10% of the stated dimension or parameter. In accordance with still other embodiments, the length L of each facet 112 is 4.5 times the diameter D of the wire body 120.

Figure 3:
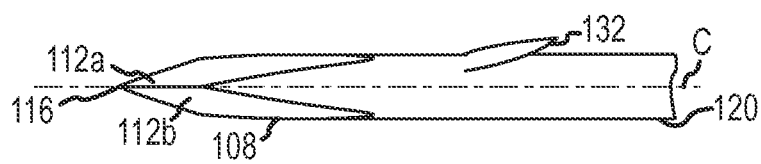
FIG. 3 is a view taken along a line corresponding to the intersection between two adjacent facets of a fish hook with multiple convex facets in accordance with embodiments of the present invention.

FIG. 3 illustrates a view of the point portion 108 and barb 132 of the fish hook 104 shown in FIGS. 1-2, with the point portion 108 of the fish hook 104 rotated about 60° about a center axis C of the point portion 108 as compared to the view shown in FIG. 2. More particularly, the intersection between two facets 112a and 112b is shown. In addition, the tip 116 of the point portion 108 can be seen to benefit from reinforcement as a result of the convex facets 112a and 112b provided by the present invention.

Figure 4:
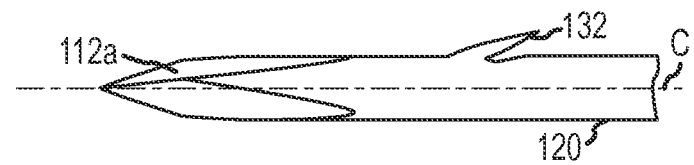
FIG. 4 is a side view of a point portion of a fish hook having multiple convex facets in accordance with embodiments of the present invention.

FIG. 4 illustrates the point portion 108 and barb 132 of the fish hook shown in FIGS. 1-3, in side elevation. Accordingly, the view in FIG. 4 is with the point portion 108 of fish hook 104 rotated about 90° about the center axis C of the point portion 108 as compared to the view shown in FIG. 2, and by about 30° as compared to the view shown in FIG. 3. In FIG. 4, the convex surface of the first facet 112a is best illustrated. In accordance with embodiments of the present invention, the radius of curvature of each of the facets 112 is from about 15 times to about 50 times the diameter D of the wire body 120. In accordance with still other embodiments, the radius of curvature of each of the facets 112 is about 30 times the diameter D of the body portion 120. In accordance with still other embodiments, the radius of curvature of each facet 112 is 30 times the diameter D of the body portion 120.

Figure 5:
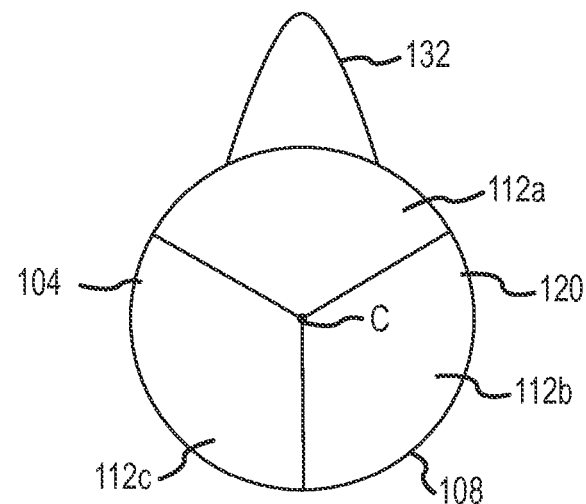
FIG. 5 is an end on view of a point portion of a fish hook with multiple convex facets in accordance with embodiments of the present invention.

FIG. 5 is an end on view, taken along the center axis C of the point portion 108 of the fish hook 104, of the point portion 108 and barb 132 of the fish hook illustrated in FIGS. 1-4. In particular, FIG. 5 shows each of the three facets 112a, 112b and 112c that comprise the point portion 108 of this three faceted point embodiment.

Figure 6:
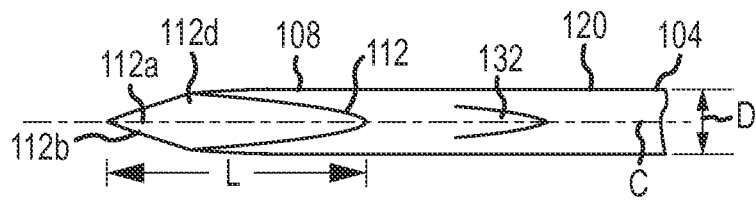
FIG. 6 is a top plan view of a point portion of a fish hook with multiple convex facets in accordance with other embodiments of the present invention.

FIG. 6 is a top plan view of the point portion 108 of a fish hook 104 in accordance with other embodiments of the present invention. More particularly, FIG. 6 illustrates a point 108 formed from four facets 112. In the view shown in FIG. 6, the radius of curvature of the second 112b and fourth 112d facets can be seen. The facet 112 length, wire body 120 diameter ratios, and the facet 112 radius of curvature to wire body 120 diameter ratios can be within the same or similar ranges as other described embodiments.

Figure 7:
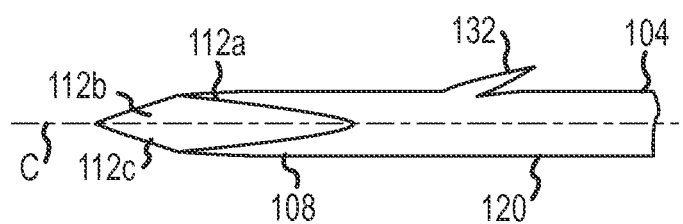
FIG. 7 is a side view of a point portion of a fish hook with multiple convex facets in accordance with other embodiments of the present invention.

FIG. 7 is a side view of the point portion 108 of a fish hook 104 of the embodiment illustrated in FIG. 6. The view in FIG. 7 is with the point portion 108 of the fish hook 104 rotated by about 90° about the center axis C of the point portion 108 as compared to the view shown in FIG. 6. FIG. 7 shows the convex curvature of the first 112a and third 112c facets of the point portion 108 of the fish hook 104. The radius of curvature of the first 112a and third 112c facets can be described by a radius of curvature that is within the same or similar ratio ranges to the wire diameter as other described embodiments.

Figure 8:
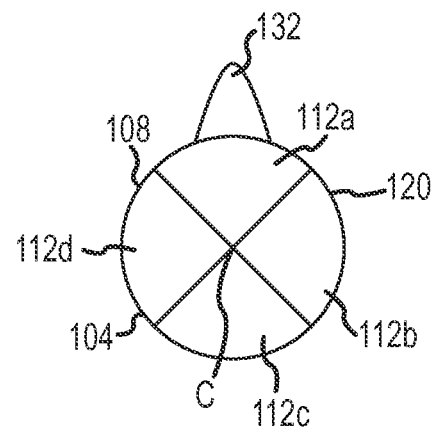
FIG. 8 is an end on view of a point portion of a fish hook having multiple facets in accordance with other embodiments of the present invention.

FIG. 8 is an end on view, taken along the center axis C of the point portion 108 of the fish hook 104, of the point portion 108 and barb 132 of the fish hook 104 illustrated in FIGS. 6 and 7. In FIG. 8, each of the facets 112a-112d can be seen.

Figure 9:
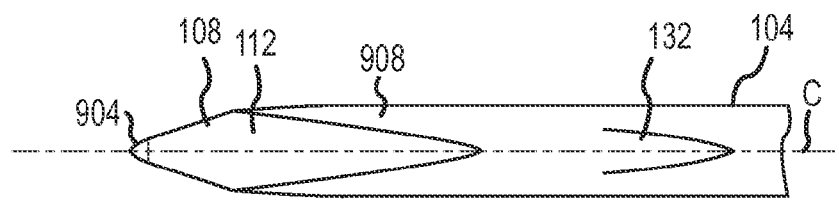
FIG. 9 is a top plan view of a point portion of a fish hook having multiple convex facets in accordance with other embodiments of the present invention.
Figure 10:
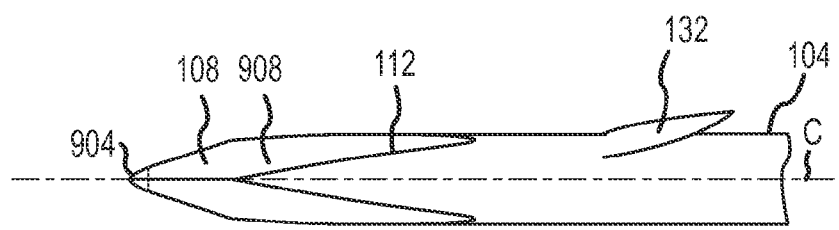
FIG. 10 is a view taken along a line corresponding to the intersection between two adjacent facets of a fish hook with multiple convex facets in accordance with other embodiments of the present invention.
Figure 11:
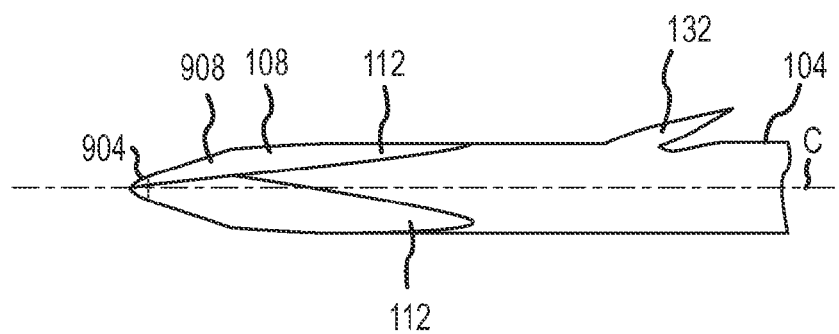
FIG. 11 is a side view of a point portion of a fish hook having multiple convex facets in accordance with other embodiments of the present invention.
Figure 12:
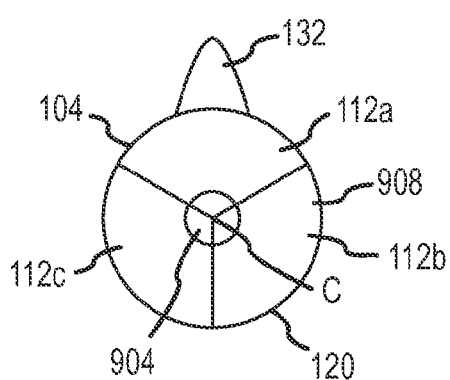
FIG. 12 is an end on view of the point portion of a fish hook with multiple convex facets in accordance with other embodiments of the present invention.

FIG. 9 is a top plan view of the point portion 108 and barb 132 of a fish hook 104 in accordance with still other embodiments of the present invention. In this embodiment, the facets 112 comprise dual radius facets. In particular, a first or tip portion 904 of each facet 112 follows a first radius of curvature, while a second portion 908 of each facet 112 follows a second radius of curvature. FIG. 10 illustrates the point portion 108 and barb 132 of the fish hook 104 of FIG. 9, with the point portion 108 of the fish hook 104 rotated about 60° about a center axis of the point portion 108 as compared to the view shown in FIG. 9. FIG. 11 illustrates the point portion 108 and barb 132 of the fish hook shown in FIGS. 9 and 10, with the point portion 108 of the fish hook 104 rotated by about 90° about a center axis of the point portion 108 as compared to the view shown in FIG. 9, and by about 30° as compared to the view shown in FIG. 10. FIG. 12 is an end on view, taken along the center axis C of the point portion 108 of the fish hook 104, of the point portion 108 and barb 132 of the fish hook illustrated in FIGS. 9-11. In particular, FIG. 12 shows each of the three facets 112a, 112b, and 112c that comprise the point portion 108 of this three faceted point embodiment. Moreover, FIG. 12 shows the first 904 and second 908 portions of each of the facets 112. In accordance with embodiments featuring dual radius facets, the first portion 904 of each facet 112 can feature or follow a radius of curvature that is different than the radius of curvature of the second portion 908. As an example, the first portion 904 of each facet 112 can feature a radius of curvature that is about 30 times the diameter D of the wire body 120, while the radius of curvature of the second portion 908 can be from about 20 times to about 100 times the diameter D of the wire body 120. As yet another example, one portion 904 or 908 can have a radius of curvature that is infinite (i.e., one portion 904 or 908 can be flat).

Although a barb 132 has been illustrated as part of a fish hook 104, it should be appreciated that a barb 132 is not required. Accordingly, a point with multiple convex facets 112 in accordance with embodiments of the present invention can be provided as part of a barbless fish hook 104. Alternatively, a point with multiple convex facets 112 in accordance with embodiments of the present invention can be provided with multiple barbs 132.

In various embodiments illustrated and described herein, the facets 112 are shown having equal sizes, radiuses of curvature and spacings. However, other embodiments can be provided with facets 112 of different sizes, radiuses of curvature and spacings. In accordance with embodiments of the present invention, a fish hook 104 with multiple facets is formed by grinding an end of a wire. Moreover, the wire may be of any diameter deemed suitable for a particular application of the hook 104 formed therefrom. In addition, although the body 120 has been described as comprising wire, other materials and/or forms of material can be provided with a multiple faceted point as part of a fish hook 104 in accordance with embodiments of the present invention. For example, a fish hook 104 with multiple convex facets 112 can be formed by molding a plastic or other material.

A fish hook 104 with multiple convex facets 112 in accordance with embodiments of the present invention can be defined using three parameters: wire diameter, point length L to wire diameter D ratio, and the ratio of the grind radius to the wire diameter D, referred to herein as the radius of curvature of the facet 112. A fish hook 104 having multiple convex facets 112 as described herein can be formed using computer numeric control machining techniques. More particularly, by providing three axes of wire blank motion, facets 112 having a convex shape can be formed. In addition, although various radiuses of curvature have been provided as examples, embodiments of the present invention are not limited thereto. In particular, a fish hook 104 having a point portion 108 formed from multiple facets 112, where each facet is convex and therefore curves outwardly from a line 114 drawn between the tip 116 of the point and the starting point 118 of the facet can be provided (see FIG. 1). Moreover, in addition to following a first radius of curvature, or following first and second radiuses of curvature, facets 112 can have three or more radiuses of curvature. In addition, the tip portion 904 can have a radius of curvature that is larger than the radius of curvature of the second portion 908 of a multiple radius faceted 112 fish hook 104.

In an exemplary configuration, a fish hook 104 featuring three convex facets 112 having a length that is 4.5 times the diameter D of the body 120 and a radius of curvature r that is 30 times the diameter of the body 120 is provided. For such an exemplary embodiment, at a distance of about 15 thousandths of an inch from the apex of the point, the amount of material in a cross-section at that location is about 2 times the amount of material provided in a conventional concave three facet point and as a result the strength of this exemplary embodiment is about twice that of the conventional faceted point. Other exemplary facet 112 length L to wire diameter D ratios include three to one and six to one. Other exemplary convex facet 112 curvatures include radius of curvature to wire diameter D ratios of 20 to 1 and 25 to 1.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A fish hook, comprising: a wire body, the wire body including a point at a first end of the wire body,
    a line attachment portion at a second end of the wire body, and a bend between the first and second ends,
    wherein the point includes at least three convex facets that intersect to form the point,
    wherein each of the facets includes a surface that is convex with respect to a line extending from the point to an end of the facet opposite the point,
    wherein the convex surface of the facet curves outwardly from the line and wherein a shank portion, the bend, and the point are all formed from a single piece of wire.

2. The fish hook of claim 1, wherein the wire body has a diameter, and wherein the convex surface of each facet has a radius of curvature of from about 15 times to about 50 times the diameter.

3. The fish hook of claim 2, wherein a length of each convex facet is from about 2 times to about 6 times the wire diameter.

4. The fish hook of claim 3, wherein the point includes only three facets.

5. The fish hook of claim 2, wherein the point includes only three facets.

6. The fish hook of claim 1, wherein the wire has a diameter, wherein the length of each convex surface is about 4.5 times the diameter of the wire, and wherein the convex surface of each facet has a radius of about 30 times the diameter of the wire.

7. The fish hook of claim 1, further comprising a barb.

8. The fish hook of claim 1, wherein each facet includes first and second convex surfaces.

9. The fish hook of claim 8, wherein the first convex surface has a first radius, and wherein the second convex surface has a second radius.

10. A fish hook, comprising:
    a wire body, wherein the wire has a diameter;
    a point with three facets at a first end of the wire, wherein each facet of the point has a curved surface that is convex with respect to a longitudinal axis of the body at the point and has a length of 4.5 times the diameter of wire, wherein the curved surface of each facet is curved outwardly from a line drawn between a tip of the point and the starting point of the facet at an end of the facet opposite the point, wherein each facet has a radius that is 30 times the diameter of the wire, and wherein the facets intersect to form the point;
    an eye at a second end of the wire;
    a bend between the eye and the point; and
    a barb between the bend and the point.

11. The fish hook of claim 1, wherein the line attachment portion is an eye.

\* \* \* \* \*